United States Patent
Kishimoto et al.

(10) Patent No.: US 8,232,354 B2
(45) Date of Patent: Jul. 31, 2012

(54) METHOD FOR PRODUCING A POLYLACTIC ACID RESIN COMPOSITION

(75) Inventors: Hiroaki Kishimoto, Wakayama (JP); Akira Takenaka, Wakayama (JP)

(73) Assignee: KAO Corporation, Tokyo (JP)

( * ) Notice: Subject to any disclaimer, the term of this patent is extended or adjusted under 35 U.S.C. 154(b) by 0 days.

(21) Appl. No.: 12/988,597

(22) PCT Filed: Apr. 27, 2009

(86) PCT No.: PCT/JP2009/058653
§ 371 (c)(1), (2), (4) Date: Oct. 19, 2010

(87) PCT Pub. No.: WO2009/133958
PCT Pub. Date: Nov. 5, 2009

(65) Prior Publication Data
US 2011/0054089 A1    Mar. 3, 2011

(30) Foreign Application Priority Data

Apr. 28, 2008   (JP) .................................. 2008-116937

(51) Int. Cl.
*C08G 63/91*   (2006.01)
(52) U.S. Cl. ......... 525/411; 525/410; 525/415; 525/450
(58) Field of Classification Search .................. 525/410, 525/411, 415, 450
See application file for complete search history.

(56) References Cited

U.S. PATENT DOCUMENTS

| | | | |
|---|---|---|---|
| 5,180,765 A * | 1/1993 | Sinclair .......................... | 524/306 |
| 7,285,589 B2 | 10/2007 | Fujihara et al. | |
| 2003/0018099 A1 | 1/2003 | Fujihira et al. | |
| 2010/0063177 A1 | 3/2010 | Takenaka et al. | |

FOREIGN PATENT DOCUMENTS

| | | |
|---|---|---|
| EP | 2067822 A1 | 6/2009 |
| JP | 2003-89721 A | 3/2003 |
| JP | 2005-220171 A | 8/2005 |
| JP | 2006-63111 A | 3/2006 |
| JP | 2006-77126 A | 3/2006 |
| JP | 2006-348159 A | 12/2006 |
| JP | 2008-63512 A | 3/2008 |
| JP | 2008-94871 A | 4/2008 |
| WO | WO 2008/044796 A1 | 4/2008 |

OTHER PUBLICATIONS

Reinecke, H.; Navarro, R.; Perez, M.; Plasticizers, Encyclopedia of Polymer Science and Technology, 2002, p. 1-27.*
Anderson, K.S.; Schreck, K.M.; Hillmyer, M.A.; Polymer Reviews, 2008, p. 85-108.*
Computer Translation of JP-2005-220171-A, published Aug. 18, 2005.
Computer Translation of JP-2006-348159-A, published Dec. 28, 2006.
Computer Translation of JP-2006-77126-A published Mar. 23, 2006.
Computer Translation of JP-2008-63512-A, published Mar. 21, 2008.
Computer Translation of JP-2008-94871-A, published Apr. 24, 2008.
English translation of International Preliminary Report on Patentability (Form PCT/IB(373) and of Written Opinion of the International Searching Authority (Form PCT/ISA/237) issued on Dec. 13, 2010 in PCT/JP2009/058653.
International Search Report dated Aug. 4, 2009 for PCT/JP2009/058653.

* cited by examiner

*Primary Examiner* — David W Wu
*Assistant Examiner* — Robert Jones, Jr.
(74) *Attorney, Agent, or Firm* — Birch, Stewart, Kolasch & Birch, LLP

(57) ABSTRACT

The present invention provides the method for producing a polylactic acid resin composition, including steps (1) and (2) step (1): adding the polycarbodiimide cross-linking agent to the polylactic acid resin to cross-link the polylactic acid resin; and
step (2): mixing the cross-linked polylactic acid resin prepared in the step (1) with the uncross-linked polylactic acid resin.

8 Claims, No Drawings

METHOD FOR PRODUCING A POLYLACTIC ACID RESIN COMPOSITION

FIELD OF THE INVENTION

The present invention relates to a method for producing a polylactic acid resin composition.

BACKGROUND OF THE INVENTION

Among biodegradable resins, polylactic acid resins are now expected to expand applications, because a production cost of L-lactic acid has been reduced by a high-volume production thereof by fermentation of sugars derived from corn and potato, these raw materials are natural agricultural crops and emit a very small amount of total carbon oxides, and the produced resins have high rigidity and good transparency. Polylactic acid resins however have relatively low impact resistance while having high rigidity to make them brittle materials, and thus are very difficult to be used alone in the field that requires impact resistance.

To solve the problem, JP-A-2006-63111 and JP-A-2006-77126 disclose polylactic acid resin compositions having improved impact resistance by cross-linking polylactic acid resins with a cross-linking agent such as a carbodiimide compound.

SUMMARY OF THE INVENTION

The present invention provides a method for producing a polylactic acid resin composition, including steps (1) and (2):

step (1): adding at least one polycarbodiimide cross-linking agent selected from poly(dicyclohexylmethanecarbodiimide) and poly(diisopropylphenylcarbodiimide) to a polylactic acid resin (hereinafter, referred to as polylactic acid resin (a)) to cross-link the polylactic acid resin (a); and step (2): mixing the cross-linked polylactic acid resin prepared in the step (1) with an uncross-linked polylactic acid resin (hereinafter, referred to as polylactic acid resin (b))

The present invention also provides a polylactic acid resin composition produced by this method.

The present invention also provides a method for producing a polylactic acid resin composition, including mixing a cross-linked polylactic acid resin prepared by adding at least one polycarbodiimide cross-linking agent selected from poly (dicyclohexylmethanecarbodiimide) and poly(diisopropylphenylcarbodiimide) (hereinafter, referred to as polylactic acid resin (a)) with an uncross-linked polylactic acid resin (hereinafter, referred to as polylactic acid resin (b)).

DETAILED DESCRIPTION OF THE INVENTION

Resin compositions described in JP-A-2006-63111 and JP-A-2006-77126 have a disadvantage of reduced fluidity. In the field of injection-molding, a material to be molded is required to have good fluidity for molding into a thin product, and a thin product is required to have increased impact resistance. Conventional resin compositions however have low fluidity in flowing into a mold and are insufficiently filled in the mold, inevitably resulting in nonuniform molded products.

Therefore, the present invention provides a method for producing a polylactic acid resin composition having both improved impact resistance and fluidity.

According to the present invention, a polylactic acid resin composition having good impact resistance and fluidity can be produced.

The method of the present invention is characterized by including the step (1) of cross-linking the polylactic acid resin (a) with a polycarbodiimide cross-linking agent and the step (2) of mixing the cross-linked polylactic acid resin (a) with the uncross-linked polylactic acid resin (b).

The conventional method of cross-linking a polylactic acid resin by adding a cross-linking agent such as a carbodiimide compound provides a resin composition having improved impact resistance but reduced fluidity. The reason is thought that a polylactic acid resin matrix is cross-linked across the matrix with the cross-linking agent to increase polymer chain entanglement. In the present invention, the cross-linked polylactic acid resin and the uncross-linked polylactic acid resin (that is, non-cross-linked polylactic acid resin) seem to construct an appropriate sea-island structure to control the cross-linked structure of the whole resins composing the polylactic acid resin composition, thereby improving impact resistance and fluidity of the polylactic acid resin composition.

The present invention provides a polylactic acid resin composition produced by the method of the present invention, having an appropriate sea-island structure constructed of the cross-linked polylactic acid resin dispersed in the uncross-linked polylactic acid resin.

[Step (1)]

The step (1) of the present invention is to cross-link the polylactic acid resin (a) by adding the polycarbodiimide cross-linking agent.

The polylactic acid resin (a) used in the step (1) is a polymer of lactic acid or a copolymer of lactic acid with a hydroxycarboxylic acid. Examples of the hydroxycarboxylic acid include glycolic acid, hydroxybutyric acid, hydroxyvaleric acid, hydroxypentanoic acid, hydroxycaproic acid, and hydroxyheptanoic acid. Preferred are glycolic acid and hydroxycaproic acid. The polymer of lactic acid preferably has a molecular structure constructed of 80 to 100% by mol of L-lactic acid or D-lactic acid unit and 0 to 20% by mol of the other enantiomer of L-lactic acid and D-lactic acid. The copolymer of lactic acid and the hydroxycarboxylic acid is constructed of 85 to 100% by mol of L-lactic acid or D-lactic acid unit and 0 to 15% by mol of the hydroxycarboxylic acid unit. These polylactic acid resins can be produced by dehydrative polymerization condensation of raw materials having required structures selected from L-lactic, D-lactic, and hydroxycarboxylic acids. These polylactic acid resins can be preferably produced by ring-opening polymerization of raw materials having required structures selected from lactide, which is a cyclic dimer of lactic acid, glycolide, which is a cyclic dimer of glycolic acid, and caprolactone and the like. Lactide includes L-lactide, which is a cyclic dimer of L-lactic acid, D-lactide, which is a cyclic dimer of D-lactic acid, meso-lactide, which is a cyclic dimer of D-lactic acid and L-lactic acid, and DL-lactide, which is a lacemate of D-lactide and L-lactide. Any of these lactides may be used in the present invention. D-lactide or L-lactide is preferably used for a main material.

In the present invention, from the viewpoints of balance of strength and impact resistance, heat-resistance, and transparency of the rein composition, a stereocomplex polylactic acid may be used for the polylactic acid. The stereocomplex polylactic acid is composed of two different polylactic acids produced from different lactic acid isomers as main components. One polylctic acid composing the stereocomplex polylactic acid (hereinafter, referred to as polylactic acid (A)) comprises 90 to 100% by mol of L-isomer and 0 to 10% by mol of the other components including D-isomer. The other polylactic acid (hereinafter, referred to as polylactic acid (B)) comprises 90 to 100% by mol of D-isomer and 0 to 10% by mol of the other components including L-isomer. As used herein, the other components than L- and D-isomers include compounds having two or more functionalities capable of forming an ester bond such as dicarboxylic acids, polyhydric alcohols, hydroxycarboxylic acids, and lactones. The other components may also include compounds having two or more unreacted functionalities capable of forming an ester bond such as polyesters, polyethers, and polycarbonates. In the stereocomplex polylactic acid, a weight ratio of polylactic acid (A) to polylactic acid (B), or polylactic acid (A)/polylactic acid (B), is preferably 10/90 to 90/10, more preferably 20/80 to 80/20, and even more preferably 40/60 to 60/40.

Examples of a commercially available polylactic acid resin include Eco Plastic U'zS (trade name, Toyota Motor Corporation), Lacea (trade name, Mitsui Chemicals, Inc.), and Nature works (trade name, Cargill Dow Polymers LLC).

Examples of the polycarbodiimide cross-linking agent used in the step (1) include aromatic polycarbodiimides such as poly(4,4'-diphenylmethanecarbodiimide), poly(p-phenylenecarbodiimide), poly(m-phenylenecarbodiimide), poly(diisopropylphenylcarbodiimide), and poly(triisopropylphenylcarbodiimide); alicyclic polycarbodiimides such as poly(dicyclohexylmethanecarbodiimide); and aliphatic polycarbodiimides such as poly(diisopropylcarbodiimide). From the viewpoint of increasing a cross-linking degree of the polylactic acid resin (a), preferred are aromatic polycarbodiimides and alicyclic polycarbodiimides, and more preferred is at least one compound selected from poly(dicyclohexylmethanecarbodiimide) and poly(diisopropylphenylcarbodiimide). From the viewpoints of impact resistance and fluidity of the polylactic acid resin composition, preferred is poly(dicyclohexylmethanecarbodiimide). These polycarbodiimide cross-linking agents may be used alone or in combination.

In the step (1), from the viewpoint of effective cross-linking of the polylactic acid resin (a), an amount of the polycarbodiimide cross-linking agent added is preferably 0.1 to 5 parts by weight, more preferably 0.25 to 2 parts by weight, and even more preferably 0.25 to 1 part by weight to 100 parts by weight of polylactic acid resin (a).

In the step (1), cross-linking of the polylactic acid resin (a) by adding the polycarbodiimide cross-linking agent is preferably conducted at a temperature not lower than 200° C. with melting and kneading. For melting and kneading, examples of a melting and kneading machine that can be used include a single- and a twin-screw continuous kneaders, a batch type kneader with a roll mill, and an open-roll type kneader. Preferably used are a single- and a twin-screw continuous kneaders. Examples of a such kneader preferably used include a twin-screw extruder model KTK (Kobe Steel., Ltd.), an extruder model TEM (Toshiba Machine Co., Ltd.), a twin-screw extruder (KCK), Ko-kneader (Buss), and a twin-screw extruder model PCM (Ikegai Tekkousho).

The method of the present invention comprises the step of cross-linking the polylactic acid resin (a) with the polycarbodiimide cross-linking agent and the step of mixing the cross-linked polylactic acid resin (a) with the polylactic acid resin (b). The cross-linked polylactic acid resin and the uncross-linked polylactic acid resin seem to construct a sea-island structure to appropriately control a degree of cross-linking of the whole polylactic acid resin composition. Therefore, the polylactic acid resin composition has both improved impact resistance and fluidity.

The cross-linking reaction in the step (1) is thus preferably facilitated. Since the cross-linking reaction of the polylactic acid resin (a) with the polycarbodiimide cross-linking agent effectively progresses at 200° C. or higher, a temperature of melting and kneading is preferably 200 to 230° C., more preferably 205 to 220° C., and even more preferably 210 to 220° C. In cases of using a melting and kneading machine, the temperature of melting and kneading refers a cylinder temperature of the kneading machine in melting and kneading. A resin temperature can be elevated to 200° C. or higher by heat by shearing by controlling a cylinder temperature of the kneading machine and/or a configuration of a screw and a rotation number thereof.

The polylactic acid resin (a) and the polycarbodiimide cross-linking agent may be mechanically mixed to a uniform state before melting and kneading. For mechanically mixing the polylactic acid resin (a) with the polycarbodiimide cross-linking agent, a general method with a mixer having a general agitation blade may be used. Any means for mixing can be used without specific limitation. In order to ensure adhesion of the polycarbodiimide cross-linking agent to the polylactic acid resin (a), the polylactic acid resin (a) may be partly dredged with a plasticizer or the like to wet the surface of the polylactic acid resin (a), and then mixed with the polycarbodiimide cross-linking agent.

Those additives may be used within the range that does not obstruct the object of the present invention, including a flame retardant, an inorganic filler, an antioxidant, a lubricant, an antistatic agent, an antifogging agent, a light stabilizer, a UV absorber, a pigment, a fungicide, an antibacterial agent, and a foaming agent. From the viewpoint of effective cross-linking of the polylactic acid resin (a), these additives are preferably added in the step (2).

In the method for producing a polylactic acid resin composition of the present invention, steps (1) and (2) may be performed separately, or subsequently in a kneader having two or more inlets for raw materials. In the case of separately performing steps (1) and (2), after the melting and kneading operation is carried out to cross-link the polylactic acid resin (a) in the step (1), from the viewpoints of mixing properties with the polylactic acid resin (b) and workability in the step (2), a melted and kneaded product (the cross-linked of the polylactic acid resin (a)) is preferably pelletized to a diameter of 1 to 5 mm by strand-cutting or the like when it is subjected to the step (2).

[Step (2)]

The step (2) of the present invention is to mix the cross-linked polylactic acid resin prepared in the step (1) with the polylactic acid resin (b).

The polylactic acid resin (b) used in the step (2) may be same to or different from the polylactic acid resin (a) used in the step (1), but is not cross-linked with a cross-linking agent such as polycarbodiimide. From the viewpoint of impact resistance of the polylactic acid resin composition, a mixing ratio of the polylactic acid resin (a) to the polylactic acid resin (b), polylactic acid resin (a)/polylactic acid resin (b) (weight ratio), is preferably 40/60 to 95/5, and more preferably 70/30 to 95/5. From the viewpoint of fluidity of the polylactic acid resin composition, the mixing ratio is preferably 5/95 to 60/40, and more preferably 5/95 to 30/70. From the viewpoint of balance of impact resistance and fluidity of the polylactic acid resin composition, the mixing ratio is preferably 5/95 to 95/5, more preferably 10/90 to 90/10, and even more preferably 20/80 to 80/20.

In the step (2), from the viewpoints of providing the polylactic acid resin having high flexibility, transparency, and crystallization speed and increasing impact resistance of the polylactic acid resin composition, a plasticizer is preferably used. Examples of the plasticizer used in the step (2), include, but not limited to, hydroxybenzoates such as 2-ethylhexyl hydroxybenzoate, polyhydric alcohol esters such as acetic acid ester of glycerol-ethylene oxide adduct, phthalates such as di-2-ethylhexyl phthalate, adipates such as dioctyl adipate, maleates such as di-n-butyl maleate, citrates such as tributyl acetylcitrate, alkyl phosphates such as tricresyl phosphate, tricarboxylates such as trioctyl trimellitate, polycarboxylic acid alkyl ether esters such as succinic acid triethylene glycol monomethyl ether ester, adipic acid diethylene glycol monomethyl ether ester, and 1,3,6-hexanetricarboxylic acid with polyethylene glycol monomethyl ether ester, acetylated polyoxyethylene alkyl (alkyl group having 2 to 15 carbon atoms) ethers such as acetylated polyoxyethylene hexyl ether, polyethylene glycol diacetate added with ethylene oxide at an addition mole number of 3 to 20, and polyoxyethylene 1,4-butanediol ether diacetate. From the viewpoints of providing the polylactic acid resin having high flexibility, transparency, and crystallization speed and increasing impact resistance of the polylactic acid resin composition, preferred are polyhydric alcohol esters such as acetic acid ester of glycerol-ethylene oxide adduct, polyethylene glycol diacetate added with ethylene oxide at an addition mole number of 3 to 10, and polycarboxylic acid alkyl ether esters such as succinic acid triethylene glycol monomethyl ether ester, adipic acid diethylene glycol monomethyl ether ester, and 1,3,6-hexanetricarboxylic acid triethylene glycol monomethyl ether ester. More preferred are at least one compound selected from polyethylene glycol monomethyl ether ester of succinic acid, adipic acid or 1,3,6-hexanetricarboxylic acid and esters of acetic acid with glycerol- or ethylene glycol-ethylene oxide adducts. From the viewpoints of providing the polylactic acid resin having high flexibility, transparency, crystallization speed, and bleeding resistance and increasing impact resistance and fluidity of the polylactic acid resin composition, even more preferred are succinic acid triethylene glycol monomethyl ether ester, adipic acid diethylene glycol monomethyl ether ester, 1,3,6-hexanetricarboxylic acid triethylene glycol monomethyl ether ester, and acetic acid esters of glycerol-ethylene oxide adducts at an addition mole number of 3 to 6. These plasticizer may be used alone or in combination.

In the step (2), from the viewpoints of providing the polylactic acid resin having high flexibility, transparency, crystallization speed, and bleeding resistance and increasing impact resistance and fluidity of the polylactic acid resin composition, an amount of the plasticizer used is preferably 5 to 30 parts by weight, more preferably 7 to 25 parts by weight, and even more preferably 8 to 20 parts by weight to 100 parts by weight of the total weight of the polylactic acid resin (a) and the polylactic acid resin (b).

In the step (2), from the viewpoints of increasing impact resistance, fluidity, moldability, and heat resistance of the polylactic acid resin composition, a crystal nucleating agent is preferably further added. Either of organic or inorganic crystal nucleating agents may be used in the step (2). Organic crystal nucleating agents are preferred.

Examples of the organic crystal nucleating agent include the following crystal nucleating agents (1) and (2).

Crystal nucleating agent (1) : at least one compound selected from those having a hydroxy group and an amide group in a molecule and hydroxyfatty acid esters Crystal nucleating agent (2) : at least one compound selected from the group consisting of phenylphosphonic acid metal salts, phosphoric acid ester metal salts, aromatic sulfonic acid dialkyl ester metal salts, rosin acid metal salts, aromatic carboxamide, rosin acid amides, carbohydrazides, N-substituted ureas, salts of melamine compounds, and uracils Among crystal nucleating agents (1), for compounds having a hydroxy group and an amide group in a molecule, preferred are aliphatic amides having a hydroxy group, and more preferred are aliphatic amides having two or more hydroxy groups and two or more amide groups. Specific examples of the compound having a hydroxy group and an amide group in a molecule include hydroxyfatty acid monoamides such as 12-hydroxystearic acid monoethanolamide; and hydroxyfatty acid bisamides such as methylenebis (12-hydroxystearic acid amide), ethylenebis (12-hydroxystearic acid amide), and hexamethylenebis (12-hydroxystearic acid amide). From the viewpoint of impact resistance, fluidity, moldability, and heat resistance of the polylactic acid resin composition and bloom resistance of the crystal nucleating agent, preferred are alkylenebis(hydroxystearic acid amide) such as methylenebis(12-hydroxystearic acid amide), ethylenebis(12-hydroxystearic acid amide) or hexamethylenebis (12-hydroxystearic acid amide).

Among crystal nucleating agents (1), for hydroxyfatty acid esters, preferred are hydroxyfatty acid esters of which a fatty acid has 12 to 22 carbon atoms, and more preferred are such hydroxyfatty acid esters further having two or more hydroxy group and two or more ester groups. Specific examples of the hydroxyfatty acid ester include 12-hydroxystearic acid triglyceride, 12-hydroxystearic acid diglyceride, 12-hydroxystearic acid monoglyceride, pentaerythritol-mono-12-hydroxystearate, pentaerythritol-di-12-hydroxystearate, and pentaerythritol-tri-12-hydroxystearate. From the viewpoint of impact resistance, fluidity, moldability, and heat resistance of the polylactic acid resin composition and bloom resistance of the crystal nucleating agent, preferred is 12-hydroxystearic acid triglyceride.

Specific examples of the crystal nucleating agent (2) include phenylphosphonic acid metal salts such as phenylphosphonic acid zinc salt; phosphoric acid ester metal salts such as sodium-2,2'-methylenebis(4,6-di-t-butylphenyl) phosphate, and aluminium bis[2,2'-methylenebis(4,6-di-t-butylphenyl)phosphate]; aromatic sulfonic acid dialkyl ester metal salts such as dimethyl 5-sulfoisophthalate dibarium salt and dimethyl 5-sulfoisophthalate dicalcium salt; rosin acid metal salts such as potassium methyldehydroabietate; aromatic carboxamides such as trimesic acid tris(t-butylamide), m-xylylenebis(12-hydroxystearic acid amide), and 1,3,5-benzenetricarboxylic acid tricyclohexylamide; rosin acid amides such as p-xylylenebis(rosin acid amide); carbohydrazides such as decamethyelenecarbonyldibenzoylhydrazide; N-substituted ureas such as xylenebisstearylurea; salts of melamine compounds such as melamine cyanurate; and uracils such as 6-methyluracil.

Among these crystal nucleating agents (2), from the veiwpoint of crystallization speed, preferred are phenylphosphonic acid metal salts. A phenylphosphonic acid metal salt is a metal salt of phenylphosphonic acid having a phenyl group that may be substituted and a phspone group ($—PO(OH)_2$). Examples of the substituent of the phenyl group include alkyl groups having 1 to 10 carbon atoms and alkoxycarbonyl groups an alkoxy group of which has 1 to 10 carbon atoms. Specific examples of the phenylphosphonic acid include unsubstituted phenylphosphonic acid, methylphenylphosphonic acid, ethylphenylphosphonic acid, propylphenylphosphonic acid, butylphenylphosphonic acid, dimethoxycarbonylphenylphosphonic acid, and diethoxycarbonylphenylphosphonic acid. Unsubstituted phenylphosphonic acid is preferred.

Examples of the phenylphosphonic acid metal salt include a salt of lithium, sodium, magnesium, aluminium, potassium, calcium, barium, copper, zinc, iron, cobalt or nickel. A zinc salt is preferred.

Any inorganic nucleating agent can be used without specific limitation. From the viewpoints of increasing heat resistance, moldability, and crystallizaion degree, preferred are silicates such as talc, smectite, bentonite, dolomite, sericite, feldspar powder, kaolin, mica, and montmorillonite.

From the viewpoints of impact resistance, fluidity, moldability, and heat resistance of the polylactic acid resin composition and bloom resistance of the crystal nucleating agent, particularly preferred for the crystal nucleating agent used in the step (2) is at least one compound selected from methylenebis(12-hydroxystearic acid amide), ethylenebis(12-hydroxystearic acid amide), hexamethylenebis(12-hydroxystearic acid amide) and phenylphosphonic acid metal salts. These crystal nucleating agent may be used alone or in combination. From the viewpoint of impact resistance and moldability of the polylactic acid resin composition, preferably used is a combination of these crystal nucleating agents, and more preferably used is a combination of ethylenebis(12-hydroxystearic acid amide) and a phenylphosphonic acid metal salt.

In the step (2), from the viewpoints of impact resistance, fluidity, and moldability of the polylactic acid resin composition and bloom resistance of the crystal nucleating agent, an amount of the crystal nucleating agent used is preferably 0.1 to 5 parts by weight, more preferably 0.1 to 3 parts by weight, and even more preferably 0.2 to 2 parts by weight to 100 parts by weight of the total amount of the polylactic acid resin (a) and the polylactic acid resin (b).

The plasticizer and the crystal nucleating agent used in the step (2) interact with the cross-linked polylactic acid resin (a) and the polylactic acid resin (b) to further improve impact resistance and fluidity of the polylactic acid resin composition.

In the step (2), those ingredients other than that described above may be used within the range that does not obstruct the object of the present invention, including a flame retardant, an inorganic filler, an antioxidant, a lubricant, an antistatic agent, an antifogging agent, a light stabilizer, a UV absorber, a pigment, a fungicide, an antibacterial agent, and foaming agent.

From the viewpoint of increasing flame retardancy of the polylactic acid resin composition, a flame retardant may be preferably incorporated. Specific examples of the flame retardant include halogen-containing compounds such as bromine- and chlorine-containing compounds, antimony compounds such as antimony trioxide, inorganic hydrates (metal hydroxides such as aluminium hydroxide and magnesium hydroxide), and phosphorus compounds such as phosphate esters and phosphoric acid salts. The flame retardant may be subjected to a surface treatment with a silane coupling agent or the like. An amount of the flame retardant used can be determined with monitoring effects of the flame retardant. For achieving good effects of flame retardancy while preventing reduction of flow characteristics in processing, strength of a molded product, flexibility of the composition, and heat resistance, the amount is preferably 10 to 150 parts by weight, more preferably 15 to 140 parts by weight, and even more preferably 20 to 130 parts by weight to 100 parts by weight of the total amount of the polylactic acid resin (a) and the uncross-linked polylactic acid resin (b).

From the viewpoint of improving physical properties such as rigidity, the polylactic acid resin composition of the present invention preferably further comprises an inorganic filler. In the present invention, fibrous, plate, granular, and powdery inorganic fillers generally used for reinforcing a thermoplastic resin may be used. Specific examples of the inorganic fillers include fibrous inorganic fillers such as glass fiber, asbestos fiber, carbon fiber, graphite fiber, metal fiber, potassium titanate whisker, aluminium borate whisker, magnesium-based whisker, silicon-based whisker, wollastonite, sepiolite, asbestos, slag fiber, zonolite, ellestadite, gypsum fiber, silica fiber, silica/alumina fiber, zirconia fiber, boron nitride fiber, silicon nitride fiber, and boron fiber; and plate and granular inorganic fillers such as glass flake, non-swelling mica, swelling mica, graphite, metal foil, ceramic bead, talc, clay, mica, sericite, zeolite, bentonite, organically-modified bentonite, organically-modified montmorillonite, dolomite, kaolin, fine powdered silicic acid, feldspar powder, potassium titanate, silas balloon, calcium carbonate, magnesium carbonate, barium sulfate, calcium oxide, aluminium oxide, titanium oxide, aluminium silicate, silicon oxide, gypsum, novaculite, dawsonite and white clay (terra abla). Among these inorganic fillers, preferred are carbon fiber, glass fiber, wollastonite, mica, talc and kaolin. An aspect ratio of the fibrous inorganic filler is preferably not less than 5, more preferably not less than 10, and even more preferably not less than 20.

The inorganic filler may be coated or sized with a thermoplastic resin such as an ethylene/vinyl acetate copolymer or a thermosetting resin such as an epoxy resin, or may be treated with a coupling agent such as aminosilane and epoxysilane. From the viewpoint of heat resistance of a molded polylactic acid resin composition, among fibrous inorganic fillers, preferred is glass fiber. From the viewpoint of moldability and heat resistance of a molded polylactic acid resin composition, a diameter of the glass fiber is preferably 1 to 20 μm, more preferably 1 to 15 μm, and even more preferably 1 to 10 μm. An amount of the inorganic filler used is preferably 1 to 100 parts by weight, and more preferably 5 to 50 parts by weight, to 100 parts by weight of the total amount of the polylactic acid resin (a) and the polylactic acid resin (b)

From the viewpoint of improving physical properties such as strength, heat resistance, and impact resistance, the polylactic acid resin composition of the present invention may further comprise organic synthetic fibers having high strength. Specific examples of the organic synthetic fibers having high strength include aramid, polyarylate, and PBO fibers. From the viewpoint of heat resistance, aramid fibers are preferred.

In the step (2), components described above are mixed, and then melted and kneaded. From the viewpoint of achieving a well dispersed state of components, a temperature of melting and kneading is preferably 170 to 240° C., and more preferably 170 to 220° C. For conducting a melting and kneading operation, the same melting and kneading machine to that used for melting and kneading in the step (1) is preferably used. In the same way as the step (1), the cross-linked polylactic acid resin prepared in the step (1), the polylactic acid resin (b), and if needed, the plasticizer, the crystal nucleating agent, and other ingredients, can be mechanically uniformly mixed and then melted and kneaded.

A melted and kneaded product can be filled into a mold by injection-molding or the like to give various molded products such as a film and a sheet. From the viewpoint of increasing crystallization speed of the polylactic acid resin composition, a temperature of the mold is preferably 10 to 90° C., more preferably 20 to 85° C., and even more preferably 50 to 85° C. In the present invention, since the polylactic acid resin (a) has been previously cross-linked with the polycarbodiimide cross-linking agent in the step (1), the cross-linking reaction is suppressed in melting and kneading of the step (2), and thus the polylactic acid resin composition will have an increased fluidity.

From the viewpoint of increasing impact resistance and fluidity of the polylactic acid resin composition, a difference between temperatures of melting and kneading in the steps (1) and (2) is preferably not less than 5° C., more preferably not less than 10° C., and even more preferably not less than 15° C.

EXAMPLES

The following Examples demonstrate the present invention. Examples are intended to illustrate the present invention and not to limit the present invention.

In Examples, "part(s)" and "%" refer, unless otherwise stated, "part(s) by weight" and "% by weight".

Example 1

Step (1):

In a twin-screw extruder (Ikegai Kabushiki Kaisya, PCM-45), 50 parts of polylactic acid resin (a-1) (LACEA H-400, Mitsui Chemicals, Inc.) as a polylactic acid resin (a) and 0.5 parts of poly(dicyclohexylmethanecarbodiimide) (carbodilite LA-1, Nisshinbo Chemical Inc.) as a polycarbodiimide cross-linking agent were melted and kneaded under conditions of a cylinder temperature set to 200° C., a rotation number of 100 rpm, and a feeding rate of 30 kg/h. A melted and kneaded product was cut with a strand to give pellets of the polylactic acid resin cross-linked with the polycarbodiimide cross-linking agent (cross-linked polylactic acid resin) (diameter: 3 to 4 mm).

Step (2):

In a twin-screw extruder (Ikegai Kabushiki Kaisya, PCM-45), pellets of the cross-linked polylactic acid resin prepared in the step (1), polylactic acid resin (b-1) (LACEA H-400, Mitsui Chemicals, Inc.) as a polylactic acid resin (b), succinic acid triethylene glycol monomethyl ether diester as a plasticizer and ethylenebis (12-hydroxystearic acid amide) (SLIPACKS H, Nippon Kasei Chemical Co., Ltd.) as a crystal nucleating agent were mixed in amounts shown in Table 1, and melted and kneaded under conditions of a cylinder temperature set to 190° C., a rotation number of 100 rpm, and a feeding rate of 30 kg/h. A melted and kneaded product was cut with a strand to give pellets of the polylactic acid resin (diameter: 3 to 4 mm). The resultant pellets were dried for one day at 70° C. under reduced pressure to reduce a water content to 500 ppm or less.

Example 2

Pellets of a polylactic acid resin composition were prepared in the same way as in Example 1, except that a polylactic acid resin (b-2) (LACEA H-100, Mitsui Chemicals, Inc.) as a polylactic acid resin (b) was used in an amount shown in Table 1 in the step (2).

Example 3

Pellets of a cross-linked polylactic acid resin were prepared in the same way as in the step (1) of Example 1, except that poly(dicyclohexylmethanecarbodiimide) (carbodilite LA-1, Nisshinbo Chemical Inc.) was added in an amount of 0.25 parts.

Pellets of a polylactic acid resin composition were prepared in the same way as in the step (2) of Example 1, except that pellets thus prepared was used.

Example 4

Pellets of a cross-linked polylactic acid resin were prepared in the same way as in the step (1) of Example 1, except that poly(dicyclohexylmethanecarbodiimide) (carbodilite LA-1, Nisshinbo Chemical Inc.) was added in an amount of 1 part.

Pellets of a polylactic acid resin composition were prepared in the same way as in the step (2) of Example 1, except that pellets thus prepared was used.

Example 5

Pellets of a cross-linked polylactic acid resin were prepared in the same way as in the step (1) of Example 1, except that polylactic acid resin (a-1) (LACEA H-400, Mitsui Chemicals, Inc.) was used in an amount of 75 parts.

Pellets of a polylactic acid resin composition were prepared in the same way as in the step (2) of Example 1, except that pellets thus prepared was used and polylactic acid resin (b-1) (LACEA H-400, Mitsui Chemicals, Inc.) was used in an amount of 25 parts.

Example 6

Pellets of a cross-linked polylactic acid resin were prepared in the same way as in the step (1) of Example 1, except that polylactic acid resin (a-1) (LACEA H-400, Mitsui Chemicals, Inc.) was used in an amount of 25 parts.

Pellets of a polylactic acid resin composition were prepared in the same way as in the step (2) of Example 1, except that pellets thus prepared was used and polylactic acid resin (b-1) (LACEA H-400, Mitsui Chemicals, Inc.) was used in an amount of 75 parts.

Example 7

Pellets of a cross-linked polylactic acid resin were prepared in the same way as in the step (1) of Example 1, except that poly(diisopropylphenylcarbodiimide) (Stabaxol P, Rhein Chemie Japan Ltd.) was used in an amount of 0.5 parts instead of poly (dicyclohexylmethanecarbodiimide).

Pellets of a polylactic acid resin composition were prepared in the same way as in the step (2) of Example 1, except that pellets thus prepared was used.

Example 8

Pellets of a cross-linked polylactic acid resin were prepared in the same way as in the step (1) of Example 1, except that a cylinder temperature was set to 210° C.

Pellets of a polylactic acid resin composition were prepared in the same way as in the step (2) of Example 1, except that pellets thus prepared was used.

Example 9

Pellets of a polylactic acid resin composition were prepared in the same way as in Example 1, except that 1,3,6-hexanetricarboxylic acid triethylene glycol monomethyl ether triester was used as a plasticizer in an amount shown in Table 1 in the step (2).

Example 10

Pellets of a polylactic acid resin composition were prepared in the same way as in Example 1, except that triacetate of an adduct of 6 moles of ethylene oxide to glycerol was used as a plasticizer in an amount shown in Table 1 in the step (2).

Example 11

Pellets of a polylactic acid resin composition were prepared in the same way as in Example 1, except that adipate diester (DAIFATTY-101, Daihachi Chemical Industry Co., Ltd.) was used as a plasticizer in an amount shown in Table 1 in the step (2).

Example 12

Pellets of a polylactic acid resin composition were prepared in the same way as in Example 1, except that ethylenebis (12-hydroxystearic acid amide) (SLIPACKS H, Nippon kasei Chemical Co., Ltd.) and unsubstituted phenylphosphonic acid zinc salt (PPA-Zn, Nissan Chemical Industries Ltd.) were used as crystal nucleating agents in amounts shown in Table 1 in the step (2).

Example 13

Pellets of a cross-linked polylactic acid resin were prepared in the same way as in the step (1) of Example 1, except that a cylinder temperature was set to 220° C.

Pellets of a polylactic acid resin composition were prepared in the same way as in the step (2) of Example 1, except that pellets thus prepared was used.

Example 14

Pellets of a polylactic acid resin composition were prepared in the same way as in Example 12, except that a phosphate salt (ADK STAB FP-2200, Adeka Corporation) was used as a flame retardant in an amount shown in Table 1 in the step (2).

Example 15

Pellets of a polylactic acid resin composition were prepared in the same way as in Example 12, except that aluminium hydroxide (B703, Nippon Light Metal Co., Ltd.) and a phosphate ester (Reofos 65, Ajinomoto Fine-Techno Co., Inc.) as flame retardants and glass fiber (T-187, Nippon Electric Glass Co., Ltd.) as an inorganic filler were used in amounts shown in Table 1 in the step (2).

Example 16

Pellets of a polylactic acid resin composition were prepared in the same way as in Example 12, except that aluminium hydroxide (Ltd, B703, Nippon Light Metal Co.) as a flame retardant and glass fiber (T-187, Nippon Electric Glass Co., Ltd.) as an inorganic filler were used in amounts shown in Table 1 in the step (2).

Example 17

Pellets of a polylactic acid resin composition were prepared in the same way as in Example 16, except that succinic acid triethylene glycol monomethyl ether diester and an adipate diester (DAIFATTY-101, Daihachi Chemical Industry Co., Ltd.) as plasticizers were used in amounts shown in Table 1 in the step (2).

Comparative Example 1

The step (1) was not performed. In a twin-screw extruder (PCM-45, Ikegai Kabushiki Kaisya,), a polylactic acid resin (b-1) (LACEA H-400, Mitsui Chemicals, Inc.) as a polylactic acid resin (b), succinic acid triethylene glycol monomethyl ether diester as a plasticizer and ethylenebis(12-hydroxystearic acid amide) (SLIPACKS H, Nippon kasei Chemical Co., Ltd.) as a crystal nucleating agent were mixed in amounts shown in Table 1, and melted and kneaded under conditions of a cylinder temperature set to 190° C., a rotation number of 100 rpm, and a feeding rate of 30 kg/h. A melted and kneaded product was cut with a strand to give pellets of the polylactic acid resin composition (diameter: 3 to 4 mm) in which the polylactic acid resin was cross-linked with the polycarbodiimide cross-linking agent.

Comparative Example 2

Pellets of a polylactic acid resin composition were prepared in the same way as in Comparative Example 1, except that 0.5 parts of poly(dicyclohexylmethanecarbodiimide) (carbodilite LA-1, Nisshinbo Chemical Inc.)was added.

Comparative Example 3

Step (1):
In a twin-screw extruder (Ikegai Kabushiki Kaisya, PCM-45), 100 parts of polylactic acid resin (a-1) (LACEA H-400, Mitsui Chemicals, Inc.) as a polylactic acid resin (a) and 0.5 parts of poly(dicyclohexylmethanecarbodiimide) (carbodilite LA-1, Nisshinbo Chemical Inc.) as a polycarbodiimide cross-linking agent were melted and kneaded under conditions of a cylinder temperature set to 200° C., a rotation number of 100 rpm, and a feeding rate of 30 kg/h. A melted and kneaded product was cut with a strand to give pellets of the cross-linked polylactic acid resin (diameter: 3 to 4mm).

Step (2):
In a twin-screw extruder (PCM-45, Ikegai Kabushiki Kaisya,), pellets of the cross-linked polylactic acid resin prepared in the step (1), a plasticizer (succinic acid triethylene glycol monomethyl ether diester) and a crystal nucleating agent (ethylenebis(12-hydroxystearic acid amide) (SLIPACKS H, Nippon kasei Chemical Co., Ltd.)) were mixed in amounts shown in Table 1, and melted and kneaded under conditions of a cylinder temperature set to 190° C., a rotation number of 100 rpm, and a feeding rate of 30 kg/h. A melted and kneaded product was cut with a strand to give pellets of the polylactic acid resin composition (diameter: 3 to 4 mm).

Pellets prepared in Examples 1 to 17 and Comparative Examples 1 to 3 were evaluated for impact resistance and fluidity by methods described below. Pellets prepared in Examples 1 and 14 to 17 were also evaluated for flame retardancy and thermal distortion temperature. Results are shown in Table 1.

<Impact Resistance>
Pellets prepared were injection-molded with an injection-molding machine (J75E-D, Japan Steel Works, LTD.) under conditions of a cylinder temperature of 200° C., a mold temperature of 80° C. and a molding time of 60 seconds to give a test piece [a rectangular column (63 mm by 12 mm by 5 mm)].

The test piece was measured for Izod impact strength with an impact tester (model 863, Ueshima Seisakusho Co., Ltd.) according to JIS-K7110.

The higher Izod impact strength means the better impact resistance, but a value of Izod impact strength not lower than 100 is free from practical troubles.

<Fluidity/Spiral Flow Length>

Pellets prepared were injection-molded with an injection-molding machine (J75E-D, Japan Steel Works, LTD.) with a mold capable of molding a spiral piece having a width of 8 mm and a thickness of 3 mm under conditions of a cylinder temperature of 200° C., a mold temperature of 80° C., and an injection-molding pressure of 942 MPa. In injection-molding, a flow length was measured. A flow length was measured by reading a scale engraved on the molded piece. Since a flow length varies until a mold temperature became a stable state, among shots after at least 20 shots from the start of molding, 10 shots were used to calculate an average flow length. A value of the average flow length divided by a thickness, average flow length/thickness=L/D, was considered as an indicator of fluidity.

The higher value means the better fluidity, but a value of fluidity not lower than 120 is free from practical troubles.

<Flame Retardancy>

Pellets prepared were injection-molded with an injection-molding machine (J75E-D, Japan Steel Works, LTD.) under conditions of a cylinder temperature of 200° C., a mold temperature of 80° C., and a molding time of 60 seconds to give a test piece [a rectangular column (5 in by ½ in by 1/16 in)]. The test piece was subjected to a flame test according to the vertical flame test program for the standard of safety UL 94 of Underwriters Laboratories Company. The flame test includes exposing the bottom end of the test piece, held in the vertical orientation, to flame from a gas burner for 10 seconds and, if the test piece stops burning within 30 seconds, again exposing the test piece to the gas flame for 10 seconds. The test was performed with five pieces (n=5). Results were ranked to V-2, V-1, V-0, or Not according to flame classifications specified in UL 94 vertical flame test (UL94V). The classifications are shown below.

V-0

No test piece burns for 10 seconds or more after any exposure to flame.

The total burning time of five pieces by 10 times of exposure is shorter than 50 seconds.

No test piece burns to a point hold with a fixing clamp.

No test piece throws burning particles capable of igniting an absorbent cotton placed below the test piece.

No test piece keeps a red-heated state for 30 seconds or more after the second exposure.

V-1

No test piece burns for 30 seconds or more after any exposure.

The total burning time of five pieces by 10 times of exposure is shorter than 250 seconds.

No test piece burns to a point hold with a fixing clamp.

No test piece throws burning particles capable of igniting an absorbent cotton placed below the test piece.

No test piece keeps a red-heated state for 60 seconds or more after the second exposure.

V-2

No test piece burns for 30 seconds or more after any exposure.

The total burning time of five pieces by 10 times of exposure is shorter than 250 seconds.

No test piece burns to a point hold with a fixing clamp.

A test piece throws burning particles capable of igniting an absorbent cotton placed below the test piece within an acceptable degree.

No test piece keeps a red-heated state for 60 seconds or more after the second exposure.

Not

Every test piece burns longer than 30 seconds after any exposure.

<Thermal Distortion Temperature>

Pellets prepared were injection-molded with an injection-molding machine (J75E-D, Japan Steel Works, LTD.) under conditions of a cylinder temperature of 200° C., a mold temperature of 80° C. and a molding time of 60 seconds to give a test piece [a rectangular column (125 mm by 12 mm by 6 mm)]. The test piece was measured for a distortion temperature at which generating 0.25 mm deflection under a load of 1.81 MPa with a thermal distortion tester (B-32, Toyo Seiki Seisaku-Sho, Ltd.) according to JIS-K7191. The higher temperature means the better heat resistance.

TABLE 1

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Step (1) | Polylactic acid resin (a) (parts) | Polylactic acid resin(a-1)*1 | 50 | 50 | 50 | 50 | 75 | 25 | 50 | 50 | 50 | 50 | 50 |
| | Polycarbodiimide crosslinking agent (parts) | LA-1*4 | 0.5 | 0.5 | 0.25 | 1 | 0.5 | 0.5 | | 0.5 | 0.5 | 0.5 | 0.5 |
| | | STP*5 | | | | | | | 0.5 | | | | |
| | Cylinder temperature (° C.) | | 200 | 200 | 200 | 200 | 200 | 200 | 200 | 210 | 200 | 200 | 200 |
| Step (2) | Polylactic acid resin (b) (parts) | Polylactic acid resin(b-1)*2 | 50 | | 50 | 50 | 25 | 75 | 50 | 50 | 50 | 50 | 50 |
| | | Polylactic acid resin(b-2)*3 | | 50 | | | | | | | | | |
| | Plasticizer (parts) | (MeEO3)2SA*6 | 10 | 10 | 10 | 10 | 10 | 10 | 10 | 10 | | | |
| | | (MeEO3)3TA*7 | | | | | | | | | 10 | | |
| | | POE(6)GlyAc*8 | | | | | | | | | | 10 | |
| | | DAY101*9 | | | | | | | | | | | 10 |
| | Crystal nucleating agent (parts) | SLIPACKS H*10 | 0.5 | 0.5 | 0.5 | 0.5 | 0.5 | 0.5 | 0.5 | 0.5 | 0.5 | 0.5 | 0.5 |
| | | PPA-Zn*11 | | | | | | | | | | | |
| | Flame retardant (parts) | Al(OH)3*12 | | | | | | | | | | | |
| | | Reofos 65*13 | | | | | | | | | | | |
| | | FP-2200*14 | | | | | | | | | | | |
| | Inorganic filler (parts) | Glass fiber*15 | | | | | | | | | | | |
| | Crosslinking agent (parts) | LA-1*4 | | | | | | | | | | | |
| | Cylinder temperature (° C.) | | 190 | 190 | 190 | 190 | 190 | 190 | 190 | 190 | 190 | 190 | 190 |

TABLE 1-continued

| Results of evaluation | Impact resistance (J/m) | 118 | 113 | 108 | 142 | 130 | 105 | 115 | 125 | 115 | 115 | 114 |
|---|---|---|---|---|---|---|---|---|---|---|---|---|
| | Fluidity L/D | 185 | 225 | 193 | 161 | 172 | 193 | 183 | 182 | 181 | 181 | 183 |
| | Flame retardancy | Not | | | | | | | | | | |
| | Thermal distortion temperature (° C.) | 50 | | | | | | | | | | |

| | | | Example | | | | | | Comparative example | | |
|---|---|---|---|---|---|---|---|---|---|---|---|
| | | | 12 | 13 | 14 | 15 | 16 | 17 | 1 | 2 | 3 |
| Step (1) | Polylactic acid resin (a) (parts) | Polylactic acid resin(a-1)*1 | 50 | 50 | 50 | 50 | 50 | 50 | | | 100 |
| | Polycarbodiimide crosslinking agent (parts) | LA-1*4 STP*5 | 0.5 | 0.5 | 0.5 | 0.5 | 0.5 | 0.5 | | | 0.5 |
| | Cylinder temperature (° C.) | | 200 | 220 | 200 | 200 | 200 | 200 | — | — | 200 |
| Step (2) | Polylactic acid resin (b) (parts) | Polylactic acid resin(b-1)*2 Polylactic acid resin(b-2)*3 | 50 | 50 | 50 | 50 | 50 | 50 | 100 | 100 | |
| | Plasticizer (parts) | (MeEO3)2SA*6 (MeEO3)3TA*7 POE(6)GlyAc*8 DAY101*9 | 10 | 10 | 10 | 10 | 10 | 5 5 | 10 | 10 | 10 |
| | Crystal nucleating agent (parts) | SLIPACKS H*10 PPA-Zn*11 | 0.5 0.5 | 0.5 | 0.5 0.5 | 0.5 0.5 | 0.5 0.5 | 0.5 0.5 | 0.5 | 0.5 | 0.5 |
| | Flame retardant (parts) | Al(OH)3*12 Reofos 65*13 FP-2200*14 | | | 20 | 100 25 | 120 | 120 | | | |
| | Inorganic filler (parts) | Glass fiber*15 | | | | 10 | 10 | 10 | | | |
| | Crosslinking agent (parts) | LA-1*4 | | | | | | | | 0.5 | |
| | Cylinder temperature (° C.) | | 190 | 190 | 190 | 190 | 190 | 190 | 190 | 190 | 190 |
| Results of evaluation | Impact resistance (J/m) | | 121 | 138 | 130 | 135 | 125 | 123 | 80 | 145 | 145 |
| | Fluidity L/D | | 184 | 175 | 170 | 160 | 155 | 154 | 200 | 108 | 110 |
| | Flame retardancy | | | | V-2 | V-0 | V-0 | V-0 | | | |
| | Thermal distortion temperature (° C.) | | | | 50 | 80 | 85 | 85 | | | |

*[1] polylactic acid resin (a-1) (LACEA H-400, Mitsui Chemicals, Inc.)
*[2] polylactic acid resin (b-1) (LACEA H-400, Mitsui Chemicals, Inc.)
*[3] polylactic acid resin (b-2) (LACEA H-400, Mitsui Chemicals, Inc.)
*[4] poly(dicyclohexylmethanecarbodiimide) (carbodilite LA-1, Nisshinbo Chemical Inc.)
*[5] (diisopropylphenylcarbodiimide) (Stabaxol P, Rhein Chemie Japan Ltd.)
*[6] succinic acid triethylene glycol monomethyl ether diester (synthetic material)
*[7] 1,3,6-hexanetricarboxylic acid triethylene glycol monomethyl ether triester
*[8] triacetate of glycerol-ethylene oxide adduct in an addition mole number of 6
*[9] adipate diester (DAIFATTY-101, Daihachi Chemical Industry Co., Ltd.)
*[10] ethylenebis(12-hydroxystearic acid amide) (SLIPACKS H, Nippon kasei Chemical Co., Ltd.)
*[11] unsubstituted phenylphosphonic acid zinc salt (PPA-Zn, Nissan Chemical Industries Ltd.)
*[12] aluminium hydroxide (B703, Nippon Light Metal Co., Ltd.)
*[13] phosphate ester (Reofos 65, Ajinomoto Fine-Techno Co., Inc.)
*[14] phosphate salt (ADK STAB FP-2200, Adeka Corporation,)
*[15] glass fiber (T-187, Nippon Electric Glass Co., Ltd.)

Results in Table 1 shows that polylactic acid resin compositions (Examples 1 to 17) prepared by the method of the present invention including steps (1) and (2) have good impact resistance due to cross-linked polylactic acid resins and also good fluidity due to uncross-linked polylactic acid resins.

In contrast, the polylactic acid resin composition of Comparative Example 1 prepared without a cross-linking agent has good fluidity but low impact resistance. Polylactic acid resin compositions of Comparative Examples 2 and 3 not containing uncross-linked polylactic resins have good impact resistance due to cross-linking but reduced fluidity due to the cross-linking network throughout resins.

Further, polylactic acid resin compositions of the present invention (Examples 14 to 17) added with the flame retardant in the step (2) have good flame retardancy, and polylactic acid resin compositions of the present invention (Examples 15 to 17) added with glass fibers also have increased thermal distortion temperatures.

From these results, it is shown that the polylactic acid resin composition prepared by the method of the present invention has good impact resistance and fluidity.

The invention claimed is:

1. A method for producing a polylactic acid resin composition, comprising steps (1) and (2):
    step (1): adding at least one polycarbodiimide cross-linking agent selected from the group consisting of poly(dicyclohexylmethanecarbodiimide) and poly(diisopropylphenylcarbodiimide) to a polylactic acid resin (a) to cross-link the polylactic acid resin (a); and
    step (2): mixing the cross-linked polylactic acid resin prepared in the step (1) with an uncross-linked polylactic acid resin (b) and a plasticizer.

2. The method for producing a polylactic acid resin composition according to claim 1, wherein the polylactic acid resin (a) and the polycarbodiimide cross-linking agent are melted and kneaded at a temperature of 200° C. or higher in the step (1).

3. The method for producing a polylactic acid resin composition according to claim 1, wherein a crystal nucleating agent is further added in the step (2).

4. The method for producing a polylactic acid resin composition according to claim 1, wherein the plasticizer is at least an ester selected from the group consisting of polyethylene glycol monomethyl ether esters of succinic acid, adipic acid or 1,3,6-hexanetricarboxylic acid, and acetic acid ester of ethylene oxide adduct to glycerol or ethylene glycol.

5. The method for producing a polylactic acid resin composition according to claim 3 or 4, wherein the crystal nucleating agent is at least one compound selected from the group consisting of methylenebis(12-hydroxystearic acid amide), ethylenebis (12-hydroxystearic acid amide), hexamethylenebis(12-hydroxystearic acid amide) and phenylphosphonic acid metal salts.

6. The method for producing a polylactic acid resin composition according to claim 1, wherein the amount of the polycarbodiimide cross-linking agent added is 0.1 to 5 parts by weight to 100 parts by weight of polylactic acid resin (a).

7. The method for producing a polylactic acid resin composition according to claim 1, wherein the amount of the plasticizer used is 5 to 30 parts by weight to 100 parts by weight of the total weight of the polylactic acid resin (a) and the polylactic acid resin (b).

8. The method for producing a polylactic acid resin composition according to claim 1, wherein the mixing weight ratio of the polylactic acid resin (a) to the polylactic acid resin (b) is 5/95 to 95/5.

\* \* \* \* \*